United States Patent [19]

Nusairat et al.

[11] Patent Number: 4,733,100

[45] Date of Patent: Mar. 22, 1988

[54] AUTOMATIC ON/OFF CIRCUIT WITH TIME DELAY

[75] Inventors: Abdul K. Nusairat, Bellbrook; Kurt L. Farmer, Dayton, both of Ohio

[73] Assignee: Fox Technology, Inc., Dayton, Ohio

[21] Appl. No.: 3,369

[22] Filed: Jan. 14, 1987

[51] Int. Cl.$^4$ .......................... H02H 3/32; H02J 7/00
[52] U.S. Cl. ..................................... 307/9; 307/10 R; 307/10 BP; 307/141; 340/52 R; 455/343; 455/345
[58] Field of Search .............. 307/9, 10 R, 39, 10 BP, 307/112, 125, 130, 113, 115, 141, 141.14; 340/52 R, 52 A, 52 D, 52 F; 320/48, 39; 455/343, 345

[56] References Cited

U.S. PATENT DOCUMENTS

| | | | |
|---|---|---|---|
| 3,488,596 | 1/1970 | Webster et al. | 455/343 X |
| 3,560,861 | 2/1971 | Milleker et al. | 307/130 X |
| 3,599,100 | 8/1971 | Ward | 455/343 X |
| 3,967,133 | 6/1976 | Bokern | 320/48 X |
| 3,993,914 | 11/1976 | Conrad et al. | 307/10 LS |
| 4,129,812 | 12/1978 | Shigenobu et al. | 307/141 X |
| 4,137,557 | 1/1979 | Ciarniello et al. | 307/10 BP X |
| 4,218,717 | 8/1980 | Shuster | 307/10 BP X |
| 4,255,669 | 3/1981 | Naugle | 307/130 X |
| 4,323,787 | 4/1982 | Sato et al. | 307/10 R X |
| 4,380,809 | 4/1983 | Sato | 307/10 R X |
| 4,449,056 | 5/1984 | Shibazaki | 307/115 X |
| 4,521,918 | 6/1985 | Challen | 455/343 |
| 4,531,237 | 7/1985 | Bar-on et al. | 455/343 |
| 4,583,004 | 4/1986 | Yearsin | 307/64 |
| 4,595,972 | 6/1986 | Davis et al. | 455/343 X |
| 4,611,126 | 9/1986 | Miller | 307/64 |
| 4,642,479 | 2/1987 | Lombardi et al. | 307/141 |

OTHER PUBLICATIONS

"Hi-Fi Auto-Switch" by Electronics, Australia (Mar. 1980), vol. 41, No. 12.

*Primary Examiner*—William M. Shoop, Jr.
*Assistant Examiner*—Paul Ip
*Attorney, Agent, or Firm*—Jacox & Meckstroth

[57] ABSTRACT

An on/off circuit is provided to automatically turn "on" or "off" a radar warning receiver upon lapse of a preset period of time after an automobile engine is turned "on" or "off". The receiver is powered by a D.C. input signal from the battery of the automobile via its cigarette lighter plug. The circuit includes an on/off switch connected to the cigarette lighter plug and the receiver and being switchable between "on" and "off" states to correspondingly transmit and not transmit the D.C. input signal to the receiver for turning it "on" and "off". A noise sensor is also connected to the cigarette lighter plug for sensing the presence or absence of a varying noise signal superimposed on the D.C. input signal which depends on whether or not the automobile engine is running. The noise sensor senses whether or not the noise signal is present by integrating the input signal and producing a first output signal having an increasing magnitude when the noise signal is present and a second output signal having a constant low magnitude when the noise signal is absent. A time delay in the form of a resistor and capacitor network is connected between the noise sensor and on/off switch and is actuated, after lapse of a preset period of time, between high and low output states in response to the first and second output signals to, in turn, cause the on/off switch to switch between its "on" and "off" states.

9 Claims, 2 Drawing Figures

U.S. Patent  Mar. 22, 1988  4,733,100
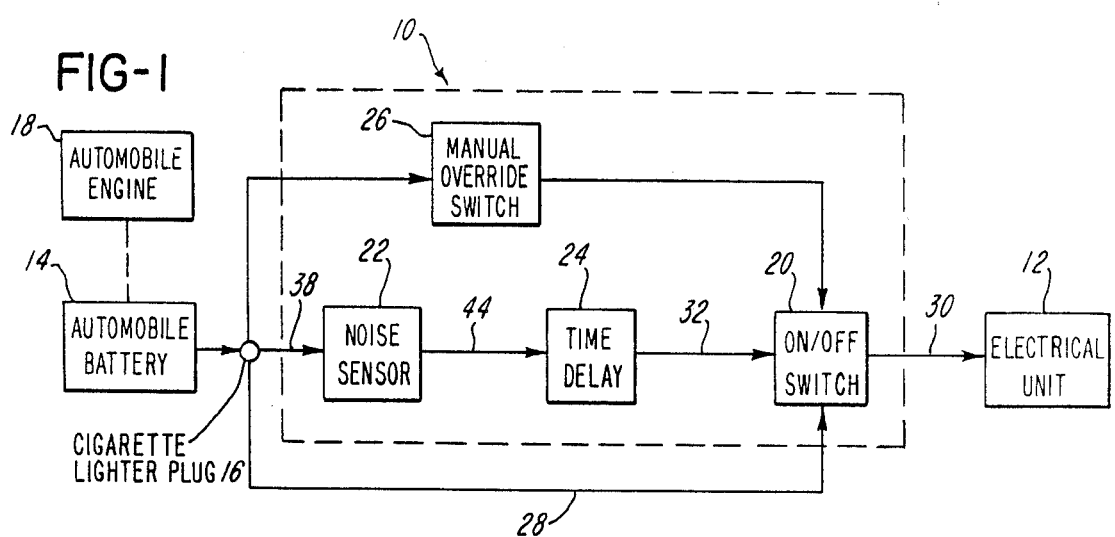
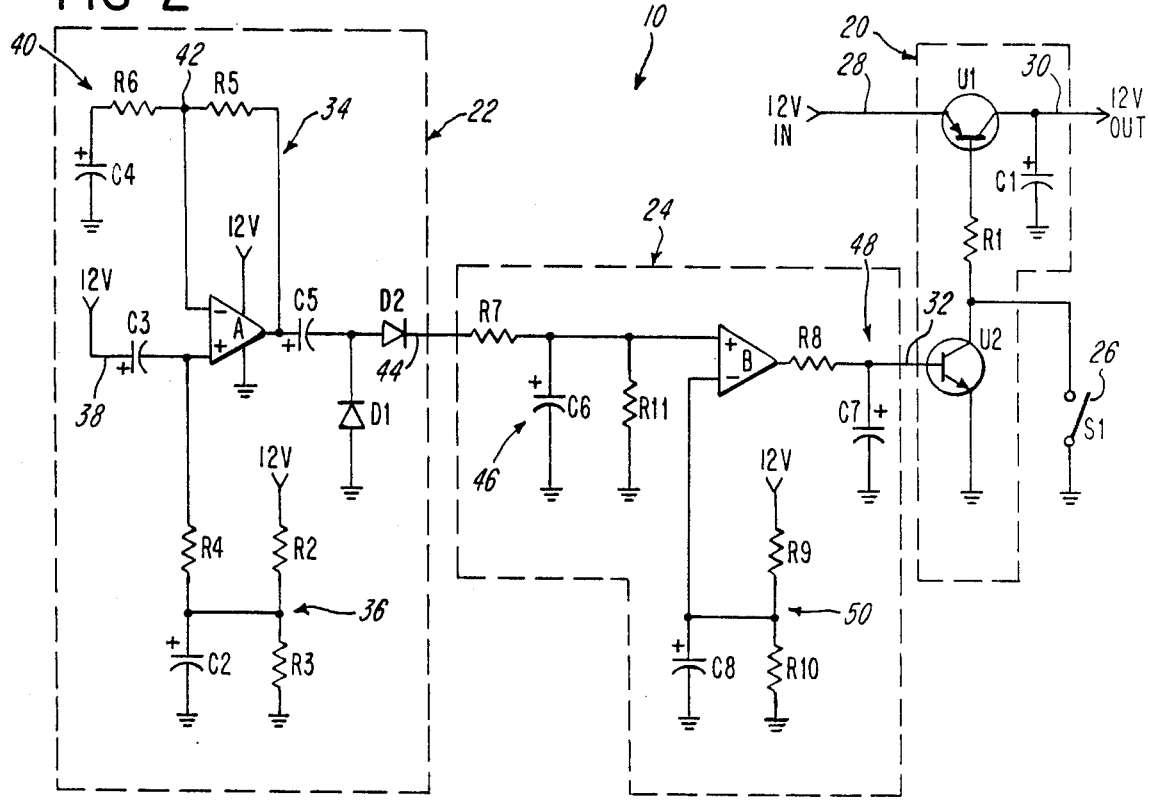

AUTOMATIC ON/OFF CIRCUIT WITH TIME DELAY

BACKGROUND OF THE INVENTION

There are a variety of different electrical units adapted for use in an automobile. These units are designed to receive power for their operation from the battery of the automobile by being plugged into the cigarette lighter plug of the automobile. One of these electrical units found in wide use currently is a radar warning receiver.

Typically, a radar warning receiver is mounted to the rear view mirror or upon the dash of the automobile and left plugged into the cigarette lighter plug. In most automobiles, the electrical power of the battery, for instance twelve volts, is applied constantly to the cigarette lighter plug whether the automobile engine is running or turned off. Therefore, the automobile operator must remember to manually turn off the radar warning receiver whenever turning off the automobile engine. Otherwise, the radar warning receiver, or any other electrical unit for that matter being plugged into the cigarette lighter plug, will stay turned on causing the automobile battery to run down and eventually lose its charge.

Consequently, a need exists for an alternative approach to turning off an electrical unit, such as a radar warning receiver, plugged into an automobile cigarette lighter. Preferably, the new approach should be one which works automatically and does not rely on the operator remembering to manually turn off the unit.

SUMMARY OF THE INVENTION

The present invention provides an automatic on/off circuit designed to satisfy the aforementioned needs. The electrical circuit of the invention, which is primarily intended for use in conjunction with a cigarette lighter plug in an automobile, could also be used in other applications where a battery is employed in conjunction with an engine. When the engine is turned on or off, the circuit will correspondingly turn on or off automatically after a predetermined time delay any electrical unit, for instance the radar warning receiver, being connected to the battery of the automobile.

Specifically, the on/off circuit functions to automatically turn on the electrical unit by sensing ignition noise which is superimposed on the electrical power from the battery when the automobile engine is running. Conversely, the circuit can also sense the absence of such noise, when the engine is not running, to automatically turn off the unit. In each instance, the unit is not turned on or off immediately but only after the noise is sensed or not sensed by the circuit for a predetermined period of time. Additionally, a by-pass or override switch is provided in the circuit which can be manually actuated by the operator to turn on the electrical unit when the engine is not running and the circuit would have otherwise automatically turned off the unit.

Therefore, in general terms, the automatic on/off circuit is for use with an electrical power source and an electrical unit, such as a radar warning receiver, being adapted to receive a substantially nonvarying electrical input signal from the electrical power source for operation of the unit. The electrical power source is associated with a motive power source having operating and nonoperating states such that whenever the motive power source is in its operating state the nonvarying electrical input signal has superimposed thereon a varying electrical noise signal, whereas whenever the motive power source is in its nonoperating state the varying electrical noise signal is absent from the nonvarying electrical input signal.

Basically, the automatic on/off circuit includes switch means which is electrically connectable between the electrical power source and the electrical unit for receiving the nonvarying electrical input signal from the electrical power source. The switch means is electrically switchable between "on" and "off" electrical states to correspondingly transmit the nonvarying electrical output signal to the electrical unit for turning it "on" and not transmit the output signal to the electrical unit for turning it "off".

The circuit also includes sensor means which is electrically connectable to the electrical power source for receiving the nonvarying electrical input signal therefrom and for sensing the presence or the absence of the varying electrical noise signal superimposed thereon. The sensor means is operable to produce a first electrical output signal when the presence of the varying electrical noise signal is sensed and a second electrical output signal when the absence of the varying noise signal is sensed.

Further, the circuit includes time delay means which is electrically connected between the sensor means and the switch means for receiving the respective first and second electrical output signals from the sensor means and being actuated in response thereto to corresponding first and second output states after lapse of a preset period of time. The time delay means when actuated to its first state from its second state after lapse of the preset time period causes the switch means to switch from its "off" to "on" state, whereas when actuated to its second state from its first state after lapse of the preset time period causes the switch means to switch from its "on" to "off" state.

Additionally, the circuit includes a manually-actuated override switch which is electrically connectable between the electrical power source and the switch means for receiving the nonvarying electrical input signal from the electrical power source. The override switch is electrically switchable between "closed" and "open" electrical states to correspondingly transmit and not transmit the nonvarying electrical output signal to the switch means to switch it between its "on" and "off" states when the motive power sourse is turned off.

BRIEF DESCRIPTION OF THE DRAWINGS

FIG. 1 is a block diagram of an automatic on/off circuit of the present invention shown connected to an automobile battery and cigarette lighter and to an electrical unit, such as a radar warning receiver.

FIG. 2 is a schematic circuit diagram of the on/off circuit illustrating in detail the makeup of the components of the circuit represented by the block diagram of FIG. 1.

DETAILED DESCRIPTION OF THE INVENTION

Referring to the drawings, FIG. 1 shows in block diagram form an automatic on/off circuit 10 electrically connected between an electrical unit 12, such as a radar warning receiver, and an electrical power source, such as an automobile battery 14, via a cigarette lighter plug 16 of the automobile. The on/off circuit 10 is adapted to automatically turn "on" or "off" the radar warning receiver 12 upon lapse of a preset period of time after an automobile engine 18 is turned "on" or "off". The radar warning receiver 12 is powered by a nonvarying electrical input signal, typically a twelve volt D.C. signal, from the battery 14 of the automobile via its cigarette lighter plug 16. The on/off circuit 10 functions to automatically turn "on" the receiver 12 by sensing ignition noise which is superimposed on the D.C. input signal from the battery 14 when the engine 18 of the automobile, being associated with the battery, is running. When the engine 18 is off, the D.C. input signal is free of noise. However, when the engine is running, a varying electrical noise signal, for example of about 200-300 millivolts noise level, appears superimposed on the D.C. input signal.

Referring to both FIGS. 1 and 2, the on/off circuit 10 basically includes an on/off switch 20, a noise sensor 22 and a time delay 24. Also, the circuit 10 includes a manual override switch 26.

The on/off switch 20 of the circuit 10 is electrically connected to the cigarette lighter plug 16 and the radar warning receiver 12 by input and output leads 28, 30. As shown in Fig. 2, the on/off switch 20 is composed of a pair of solid-state switching devices in the form of a PNP transistor U1 and a NPN transistor U2. The base of transistor U1 is connected to the collector of transistor U2 through a resistor R1. The emitter and base of transistor U2 are connected respectively to ground and an output lead 32 from the time delay 24. The emitter and collector of transistor U1 are connected respectively to the input lead 28 from the cigarette lighter plug 16 and the output lead 30 to the radar warning receiver 12.

A capacitor C1 is also connected between ground and the output lead 30 from the transistor U1. Since the engine 18 is running to power the automobile while the radar warning receiver 12 is being operated by the D.C. input signal, the varying electrical noise signal of the engine will be superimposed also on the D.C. input signal transmitted from the cigarette lighter plug 16 through the transistor U1 to the receiver 12. However, the capacitor C1 will shunt to ground the varying noise signal component of the input signal so that the D.C. input signal supplied to the receiver 12 will be substantially free of noise.

By means to be described shortly, the transistor U2 of the on/off switch 10 is switched between "on" and "off" (or conducting and nonconducting) states by the application of signal levels, being respectively higher and lower than the threshold of the transistor U2, to its base. When the transistor U2 is switched between its "on" and "off" states, the transistor U1, in turn, is switched between "on" and "off" (conducting and nonconducting) states to correspondingly transmit and not transmit the D.C. input signal to the receiver 12 for turning it "on" and "off".

Also, the noise sensor 22 of the circuit 10 is electrically connected to the cigarette lighter plug 16 by input lead 38. Its function is to sense the presence or absence of the varying noise signal superimposed on the D.C. input signal which depends on whether or not the automobile engine 18 is running.

As shown in FIG. 2, the noise sensor 22 is composed of an integrator 34 and a voltage divider 36 formed by resistors R2 and R3 and connected to the twelve volt battery 14 via the cigarette lighter plug 16. Also, a capacitor C2 is connected between the resistors R2, R3 and to ground for shunting to ground the noise signal when superimposed on the D.C. input signal to the voltage divider 36. Further, a resistor R4 is connected between the integrator 34 and the capacitor C2 and resistors R2, R3 of the voltage divider 34. Preferably, resistors R2 and R3 are of equal value while resistor R4 is much larger than both so that little current flows through it causing the six volt output of the voltage divider 36 to be imposed on the noninverting input of an operational amplifier A in the integrator 34. Another capacitor C3 is coupled to the noninverting input of the operational amplifier A and to the cigarette lighter plug 16 by the input lead 38. Only the varying noise signal if present on the D.C. input signal is coupled through the capacitor C3 to the noninverting input of the integrator's operational amplifier A.

In addition to the operational amplifier A, the integrator 34 includes a resistor R5 connected in feedback relation between the output and inverting input of the op-amp A, and a network 40 composed of a resistor R6 and a capacitor C4. The capacitor C4 is connected between ground and the resistor R6, while the resistor R6 is connected to a summing junction 42 with the feedback resistor R5 and the inverting input of the op-amp A. The network 40 defines a predetermined time period over which the capacitor C4 will charge such that the input signal to the noninverting input of the op-amp A is integrated by coaction of the op-amp A and the network 40. Also, preferably the feedback resistor R5 has a value substantially greater than that of the resistor R6 so that the output of the operational amplifier A is amplified according.

Therefore, due to the above-described arrangement, the integrator 34 senses whether or not the varying noise signal is present on the D.C. input signal by integrating the input signal and producing on its output lead 44 a first output signal having a magnitude which increases over the predetermined time period of the network 40 when the varying noise signal is present and a second output signal having a constant low magnitude close to zero when the varying noise signal is absent. Another capacitor C5 is interposed in the output lead 44 of the integrator 34 to block to the D.C. component of the output signal from op-amp A. Also, a diode D1 connected between the lead 44 and ground prevents the signal from going below zero to protect the op-amp A, while another diode D2 prevents reversal of current flow in lead 44 back toward the op-amp A.

The time delay 24 of the circuit 10 is electrically connected between the noise sensor 22 and the on/off switch 20 by respective leads 44 and 32. After lapse of a present period of time, the time delay 24 is actuated between high and low output states in response to the first and second output signals of the noise sensor 22. Actuation of the time delay 24 between its respective high and low output states, in turn, cause the on/off switch 20 to correspondingly switch between its "on" and "off" states, in the manner described earlier.

As shown in FIG. 2, the time delay 24 is composed of an operational amplifier B, a first network 46 of a resistor R7 and capacitor C6 electrically connected in the output lead 44 from the noise sensor 22 between the diode D2 and the noninverting input of the op-amp B, and a second network 48 of a resistor R8 and capacitor C7 electrically connected in the output lead 32 of the time delay 24 between the output of the op-amp B and the base of the transistor U2 of the on/off switch 20. The time delay 24 also includes a voltage divider 50 formed by resistors R9 and R10 and connected to the twelve volt battery 14 via the cigarette lighter plug 16. Also, a capacitor C8 is connected between the resistors R9, R10 and to ground for shunting to ground the noise signal when superimposed on the D.C. input signal to the voltage divider 50. Further, the voltage divider 50 is connected to the inverting input of the op-amp B to provided an electrical reference voltage at some appropriate fraction of the twelve-volt D.C. signal from the battery 14.

The function of the op-amp B is to compare the respective magnitudes of the signals on its inputs and then provide on its output a signal having a low state when the magnitude of the signal at its inverting input is greater and a high state when the magnitude of the signal at its noninverting input is greater.

When the engine 18 is turned off and thus no noise signal is present, the magnitude (near zero) of the second output signal of the noise sensor 22 which is inputted to the noninverting input of the op-amp B is less than the reference input signal inputted to the inverting input of the op-amp B. The output of the op-amp B is thus at a low state, switching and holding the transistor U2 in a nonconducting or "off" state. On the other hand, when the engine 18 is turned on, a noise signal is superimposed on the D.C. input signal. Now, the increasing magnitude of the first output signal of the noise sensor 22 which is inputted to the noninverting input of the op-amp B exceeds the reference input signal to the inverting input of the op-amp B. Now, the output of the op-amp B is actuated or changed to a high state, switching and holding the transistor U2 in a conducting or "on" state.

The first resistor/capacitor network 46 at the noninverting input of the op-amp B defines the period of time that the op-amp B is delayed in being actuated from its low to high output states to turn "on" the on/off switch 20. Such delay is the time it takes the charge on the capacitor C6 to increase above the magnitude of the reference signal on the inverting input of the op-amp B. Then, when the engine 18 is turned off, a resistor R11 connected to ground is provided between the network 46 and the op-amp B which drains the charge from the capacitor C6 and resets it near zero. The values of resistor R7 and capacitor C6 are chosen so that after a time delay of approximately five (5) seconds after the engine 18 is started the radar warning receiver 12 is turned "on" by the on/off circuit 10.

The second resistor/capacitor network 48 at the output of the op-amp B defines the period of time that the on/off switch 20 is delayed in being switched from its "on" to "off" states after the op-amp B has been actuated or changed from its high to low output states due to the engine 18 being turned off. Such delay is the time it takes the charge on the capacitor C7 to decrease below the threshold of the transistor U2. Thus, the capacitor C7 discharges through the transistor U2. The values of resistor R8 and capacitor C7 are chosen so that after a time delay of approximately five seconds after the engine 18 is turned off the radar warning receiver 12 is turned "off" by the on/off circuit 10. In other words, the radar warning receiver is maintained "on" for about five seconds after the engine is turned off.

Additionally, the on/off circuit 10 includes an override switch 26 (also S1 in FIG. 2) which is electrically connected between the on/off switch 20 and the battery 14 via the cigarette lighter plug 16. The override switch 26 can be actuated manually by the operator between "closed" and "open" electrical states. Should the operator desire to turn "on" the radar warning receiver when the engine 18 is not running, the override switch 26 is used for this purpose, by being manually actuated to its "closed" state. As seen in FIG. 2, in its "closed" state, the switch 26 completes the current path from the base of the transistor U1 to ground which turns "on" the transistor and thereby the on/off switch 20 to conduct the D.C. input signal to the radar warning receiver 12.

In an exemplary embodiment of the on/off circuit 10, its above-described components can have the following values or identifying numbers:

| Component | Value or Identification |
|---|---|
| R1 | 510 ohms |
| R2 | 47K ohms |
| R3 | 47K ohms |
| R4 | 1 M ohms |
| R5 | 1 M ohms |
| R6 | 10K ohms |
| R7 | 7.5K ohms |
| R8 | 3.9K ohms |
| R9 | 47K ohms |
| R10 | 4.7K ohms |
| R11 | 1 M ohms |
| C1 | 1.0 uF |
| C2 | 1.0 uF |
| C3 | 0.001 uF |
| C4 | 0.1 uF |
| C5 | 0.1 uF |
| C6 | 4.7 uF |
| C7 | 47 uF |
| C8 | 1.0 uF |
| A & B | 2902 |
| U1 | 2N5193 |
| U2 | MPSA05 |
| D1 & D2 | 1N4148 |

While the form of the automatic time-delayed on/off circuit herein described constitutes a preferred embodiment of the invention, it is to be understood that the invention is not limited to this precise form, and that changes may be made therein without departing from the scope and spirit of the invention as defined in the appended claims.

The invention having thus been described, the following is claimed:

1. An automatic on/off ciruclt for applying power to an electrical unit, such as a radar receiver, from the electrical battery/generator power source of a motor vehicle, in which a varying electrical noise signal is superimposed whenever the vehicle's engine is running and in which said noise signal is absent whenever the engine is not running for automatically turning such unit "on" when the engine is running and for turning said unit "off" after the engine has stopped, comprising:

switch means electrically connected between said electrical power source and said electrical unit for receiving power from said electrical power source, said switch means being electrically switchable between "on" and "off" electrical states to correspondingly transmit and not transmit said power to said electrical unit for turning it "on" and "off";

sensor means electrically connected to said electrical power source sensing the presence or absence of said varying electrical noise signal superimposed thereon, said sensor means being operable to produce a first electrical output signal when the presence of said varying electrical noise signal is sensed and a second electrical output signal when the absence of said varying electrical noise signal is sensed; and time delay means electrically connected between said sensor means and said switch means for receiving said respective first and second electrical output signals from said sensor means and being actuated in response thereto to corresponding first and second output states after lapse of a preset period of time, said time delay means when actuated to said first state from said second state after lapse of said preset time period causing said switch means to switch from said "off" to "on" state and when actuated to said second state from said first state after lapse of a present time period causing said switch means to switch from said "on" to "off" state.

2. The circuit as recited in claim 1, wherein said sensor means includes an integrator which senses whether or not said varying electrical noise signal is present on said source by integrating said noise signal and producing a first output signal having a magnitude which increases over a predetermined time period when said electrical noise signal is present and a second output signal having a constant low magnitude when said electrical noise signal is absent.

3. The circuit as recited in claim 2, wherein said integrator includes:

an operational amplifier which receives said nonvarying electrical input signal at its noninverting input and has a resistor connected in feedback relation between its inverting input and its output; and a resistor and capacitor network connected at a summing junction with said feedback resistor and said inverting input of said operational amplifier and defining said predetermined time period over which said nonvarying electrical input signal is integrated by coaction of said operational amplifier and said resistor and capacitor network.

4. The circuit as recited in claim 1, wherein said time delay means includes:

an operational amplifier having inverting and noninverting inputs and an output, said first and second output states of said time delay means being high and low output states of said operational amplifier; and a resistance and capacitance network electrically connected between said output of said sensor means and said noninverting input of said operational amplifier and defining said preset period of time;

said operational amplifier receiving an electrical reference input signal at its inverting input and being operable for comparing an electrical input signal received at its noninverting input with said reference input signal and changing from said low to high output state when said input signal derives from said first output signal of said sensor means and from said high to low output state when said input signal derives from said second output signal of said sensor means.

5. The circuit as recited in claim 4, wherein said time delay means further includes another resistance and capacitance network electrically connected between said output of said operational amplifier and said switch means and defining another preset period of time during which said switch means is maintained in its "on" state after said operational amplifier has changed from its high to low output state.

6. The circuit as recited in claim 1 further comprising: manually-actuated override switch which is electrically connected between said electrical power souce and said switch means for receiving power from said source, said override switch being electrically switchable between "closed" and "open" electrical states to correspondingly transmit and not transmit said power to said switch means to switch it between its "on" and "off" states when said engine is turned off.

7. In combination with an automotive vehicle having an engine and an electric system including a battery, and in which a cigarette lighter plug is electrically connected to said battery and a radar warning receiver for supplying a D.C. electrical input signal and such that whenever said engine is running said D.C. electric input signal has superimposed thereon a varying electrical noise signal, whereas whenever said engine is not running said varying electrical noise signal is absent from said D.C. electrical input signal, an off/off circuit adapted to receive said D.C. electrical input signal from said battery via said cigarette lighter plug for operation of said radar warning reciver, said on/off circuit comprising:

a solid-state switch electrically connected between said cigarette lighter plug and said radar warning receiver for receiving said D.C. electrical input signal from said battery, said solid-state switch being electrically switchable between "on" and "off" electrical states to correspondingly transmit and not transmit said D.C. electrical output signal to said radar warning receiver for turning it "on" and "off";

a signal integrator electrically connected to said batter via said cigarette lighter plug for receiving said D.C. electrical input signal therefrom and sensing the presence or absence of said varying electrical noise signal superimposed thereon, said signal integrator being operable to produce a first electrical output signal when the presence of said varying electrical noise signal is sensed and a second electrical output signal when the absence of said varying electrical noise signal is sensed; and time delay means electrically connected between said signal integrator and said solid-state switch for receiving said respective first and second electrical output signals from said signal integrator and being actuated in response thereto to corresponding first and second output states after lapse of a preset period of time, said time delay means when actuated to said first state from said second state after lapse of said present time period causing said solid-state switch to switch from said "off" to "on" state and when actuated to said second state from said first state after lapse of said present time period causing said solid-state switch to switch from said "on" to "off" state.

8. The circuit of claim 7 in which said integrator is operable to sense whether or not said varying electrical noise signal is present on said D.C. electrical input signal by integrating an electrical input signal derived from said D.C. electrical input signal and producing a first output signal having a magnitude which increases over a predetermined time period when said electrical noise signal is present and a second output signal having a constant low magnitude when said electrical noise signal is absent;

said integrator including an operational amplifier which receives said derivative electrical input signal at its noninverting input and has a resistor connected in feedback relation between its inverting input and its output, and a resistor and capacitor network connected at a summing junction with said feedback resistor and said inverting input of said operational amplifier and defining said predetermined time period over which said D.C. electrical input signal is integrated by coaction of said operational amplifier and said resistor and capacitor network;

said time delay means including an operation amplifier having inverting and noninverting inputs and an output, said first and second output states of said time delay means being high and low output states of said operational amplifier and a resistance and capacitance network electrically connected between said output of said integrator and said noninverting input of said operational amplifier and defining said present period of time, said operational amplifier receiving an electrical reference input signal at its inverting input and being operable for comparing an electrical input signal received at its noninverting input with said reference input signal and changing from said low to high output state when said input signal derives from said first output signal of said integrator and from said high to low output state when said input signal derives from said second output signal of said integrator.

9. An on/off circuit for controlling the application of power from a vehicle electric powersupply system to a radar warning device, for applying said system to said device automatically when the vehicle's engine is running and for disconnecting said system after said engine is turned off, comprising:

noise detecting means connected to vehicle's power supply system providing a signal in a first state when noise is present in the power supply system indicating that the engine is running, and providing a signal in the second state when no noise is present indicating that the engine is not running, time delay means connected to receive said signal states from said noise detector and operable to produce a first signal after a predetermined time delay following the application of said first state thereto and operable to produce a second signal after a predetermined time delay following the application of said second signal state thereto, and electrically controllable on/off switch means connected to apply power from said vehicle power system to said warning device and having a controllable input connected to said time delay means for applying power to said device when said first output is applied thereto, indicating that noise is present in said power system and said engine is running and operable to remove power therefrom upon receipt of said second output indicating that the vehicle engine is not running.

* * * * *